US006937700B1

(12) United States Patent  (10) Patent No.: US 6,937,700 B1
Jang  (45) Date of Patent: Aug. 30, 2005

(54) DEVICE FOR AND METHOD OF OUTPUTTING DATA ON DISPLAY SECTION OF PORTABLE TELEPHONE

(75) Inventor: Jun-Sik Jang, Kwangyokshi (KR)

(73) Assignee: Samsung Electronics Co., Ltd., (KR)

( * ) Notice: Subject to any disclaimer, the term of this patent is extended or adjusted under 35 U.S.C. 154(b) by 695 days.

(21) Appl. No.: 09/641,219

(22) Filed: Aug. 18, 2000

(30) Foreign Application Priority Data

Aug. 18, 1999 (KR) ............................... 1999-34067

(51) Int. Cl.$^7$ ............................................. H04M 1/64
(52) U.S. Cl. ..................................... 379/68; 455/414.4
(58) Field of Search .......................... 379/67.1, 52, 80, 379/68, 93.01, 93.05, 93.06; 340/7.57, 913; 370/913; 455/419, 553, 563, 550, 412, 414.4, 455/553.1, 556.2

(56) References Cited

U.S. PATENT DOCUMENTS

| 5,878,339 | A | * | 3/1999 | Zicker et al. ................ 455/419 |
| 5,950,123 | A | * | 9/1999 | Schwelb et al. ............ 340/7.57 |
| 6,014,569 | A | * | 1/2000 | Bottum ....................... 370/913 |
| 6,061,718 | A | * | 5/2000 | Nelson ......................... 379/52 |
| 6,134,453 | A | * | 10/2000 | Sainton et al. .............. 455/553 |
| 6,275,690 | B1 | * | 8/2001 | Higuchi et al. .......... 379/88.01 |
| 6,374,125 | B1 | * | 4/2002 | Toba .......................... 455/403 |
| 6,377,820 | B1 | * | 4/2002 | Courtis et al. ................ 379/80 |

FOREIGN PATENT DOCUMENTS

| CN | 1142304 A | 2/1997 |
| FR | 2769781 | 10/1997 |
| JP | 5-102909 | 4/1993 |

(Continued)

OTHER PUBLICATIONS

U.K. Search and Examination Report, Apr. 9, 2001.

(Continued)

*Primary Examiner*—Fan Tsang
*Assistant Examiner*—Gerald Gauthier
(74) *Attorney, Agent, or Firm*—Dilworth & Barrese LLP (57) ABSTRACT

Disclosed is a device for outputting display data information displayed on a display section as audio of a portable telephone, comprising: an audio output key for selecting an audio output mode of the portable telephone; a memory for storing the data displayed on the display section of the portable telephone; an audio memory for storing an audio data corresponding to the audio output mode of the portable telephone; an audio processing section adapted to modulate an audio signal inputted from a microphone for conversion to an audio data, and demodulate an audio data inputted from an RF processing section and the audio data stored in the audio memory to an audio signal to output the demodulated audio signal as voice to the outside through a speaker; and a control section adapted to read out the data displayed in the display section from the memory and the audio data corresponding to a selected audio output mode from the audio memory, respectively, when a predetermined audio output mode is selected by manipulation of the audio output key to control the data read out from the memory and the audio data read out from the audio memory so that the audio data is outputted as voice to the outside through the audio processing section.

10 Claims, 4 Drawing Sheets

FOREIGN PATENT DOCUMENTS

| | | |
|---|---|---|
| JP | 6-125301 | 5/1994 |
| JP | 09-289687 | 11/1997 |
| JP | 11-136323 | 5/1999 |
| JP | 2000-184035 | 6/2000 |
| JP | 2000 134303 | 12/2000 |
| WO | WO 98 09453 | 3/1998 |
| WO | WO 9931856 A1 | 6/1999 |

OTHER PUBLICATIONS

First Office Action of the People's Republic of China dated Sep. 6, 2002, issued in a counterpart application, namely Appln. No. 00126014.6.

Japanese Office Action dated Sep. 10, 2002 issued in a counterpart application, namely, Appln. No. 2000-246479.

* cited by examiner

VOICE OUTPUT

FIG. 3

DEVICE FOR AND METHOD OF OUTPUTTING DATA ON DISPLAY SECTION OF PORTABLE TELEPHONE

BACKGROUND OF THE INVENTION

1. Field of the Invention

The present invention relates to an outputting function of a portable telephone, and more particularly to a device for and a method of audio outputting data information displayed on a display section of the portable telephone.

2. Description of the Related Art

In general, portable telephones include a variety of functions for users. For example, there are display data functions such as a receiving field strength of a radio wave, the current time and date and a telephone directory function, etc. But, such a function of displaying data information like the current time and date, etc., on the display section is the only means of outputting the data information displayed on the screen of the display section. However, it is very difficult for visually handicapped persons or persons having weak sight to read the data information displayed on the display section. Further, in the case where users use a portable telephone not including a separate display section installed on the exterior thereof, such as folder type portable telephones, there has been a problem in that the user suffers an inconvenience in having to open a closed folder or a cover in order to see data information displayed on the display section.

SUMMARY OF THE INVENTION

Therefore, the present invention has been made in an effort to solve the problems occurring in the prior art, and an object of the present invention is to provide a device for and a method of audio outputting, for example as a voice, the display data information displayed on a display section of portable telephones in response to the selection of a user.

In order to achieve the above object, according to the present invention, there is provided a device for audio outputting display data information displayed on a display section of a portable telephone, comprising:

an audio output key for selecting an audio output mode of the portable telephone;

a memory for storing the display data;

an audio memory for storing audio data corresponding to the audio output mode of the portable telephone;

an audio processing section for modulating an audio signal inputted from a microphone and for converting said audio signal into audio data, and for demodulating audio data inputted from an RF processing section and audio data stored in the audio memory to convert into an audio signal and for ouputting said audio signal as a voice; and a control section, when said audio output mode is selected by manipulation of the audio output key, for reading out the data displayed in the display section from the memory and the audio data from the audio memory and for controlling said data read out from the memory and the audio data read out from the audio memory to output said data through the audio processing section.

In a second embodiment, there is provided a device for audio outputting display information displayed on a display section of a portable telephone, comprising:

an audio output key for selecting an audio output mode of the portable telephone;

a memory for storing data displayed on the display section of the portable telephone;

an audio memory for storing audio data corresponding to the audio output mode of the portable telephone;

an audio processing section for modulating an audio signal inputted from a microphone, for converting said audio signal into audio data, for demodulating audio data inputted from an RF processing section and audio data stored in the audio memory to convert into an audio signal, and for outputting said audio signal as a voice; and, a control section, when said audio output mode is selected by manipulation of the audio output key, for reading out the data displayed in the display section from the memory and the audio data from the audio memory, and for controlling said audio processing section to output said audio data as said voice.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in greater detail to the preferred embodiments of the present invention. In the drawings, the same or similar elements are denoted by the same reference numerals even though they are depicted in different drawings. In the following description of the present invention, numerous specific details, such as specific circuit elements, are set forth to provide a more thorough understanding of the present invention. It will be apparent, however, to those skilled in the art that the invention may be practiced otherwise than according to the previously mentioned specific details. The detailed description of known functions and configurations incorporated herein are omitted when it may make the subject matter of the present invention unclear.

Figure 1:
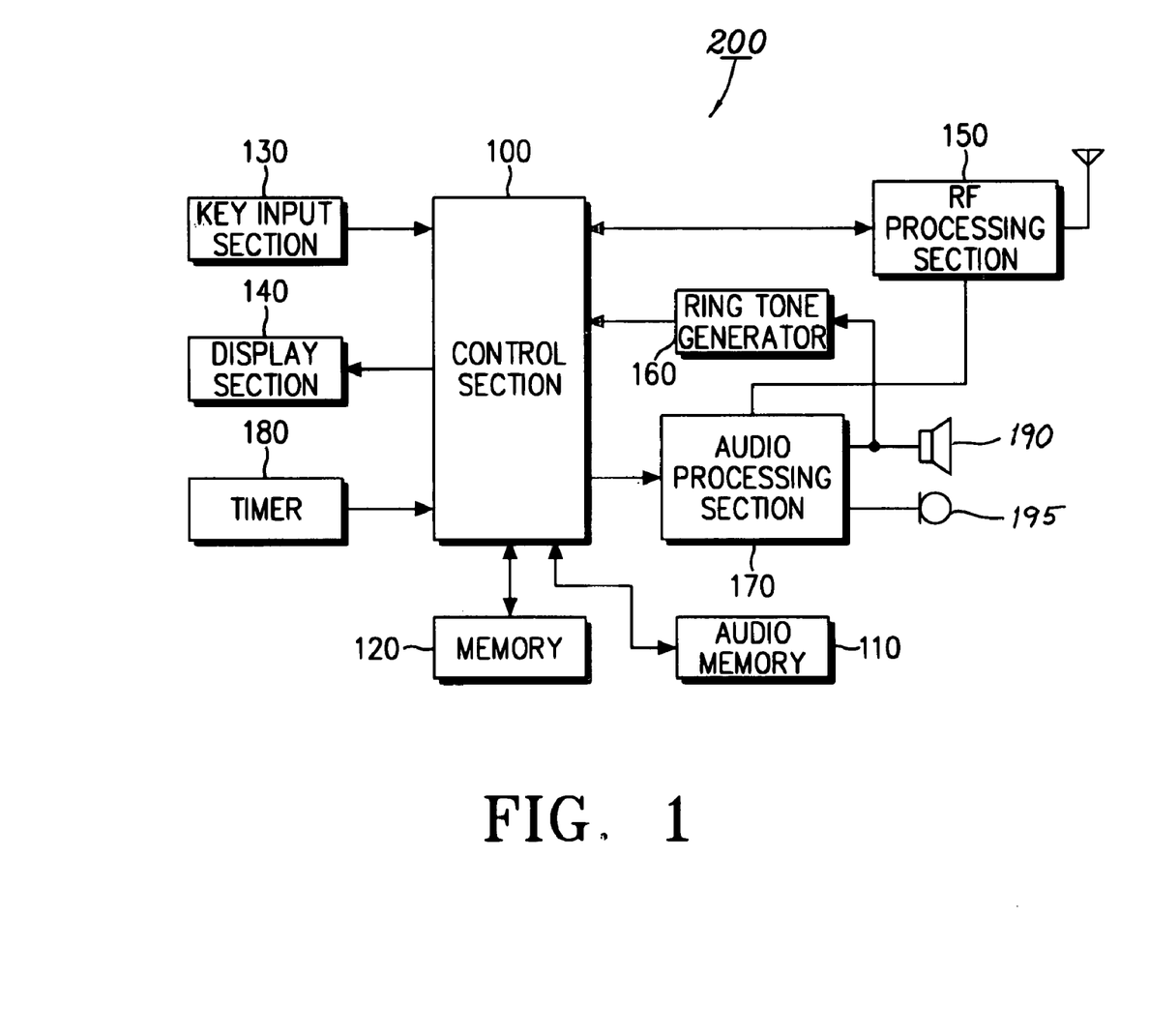
FIG. 1 is a schematic block diagram illustrating the construction of a device for outputting, as a voice, data information displayed on a display section of a portable telephone according to a preferred embodiment of the present invention.

FIG. 1 is a schematic block diagram illustrating the construction of a device for outputting, as audio, data information displayed on a display section of a portable telephone 200 according to a preferred embodiment of the present invention.

Referring to FIG. 1, a control section 100 of a portable telephone 200 according to one embodiment of the present invention controls the overall operation of the portable telephone 200. An audio memory 110 stores various audio data, such as a time audio data according to the present invention, an audio data of received messages, an audio data of not-received messages, an audio data of bell/vibration, an audio data of an antenna receiving electric field strength, etc.

A memory 120 includes a ROM for storing an operation program, an Electrically Erasable and Programmable ROM (EEPROM), and a RAM. A key input section 130 includes a plurality of numeral keys, and function keys for performing various functions (for example, an audio output key 210 shown in FIG. 3, a time mode selecting key, a received message mode selecting key, a bell/vibration mode selecting key, and an antenna receiving electric field strength mode selecting key), and is adapted to output corresponding data according to the depression of any one of the function keys to the control section 100 by an external operation. A display section 140, which is typically implemented by a display device such as a liquid crystal display (LCD) device, etc., driven under the control of the control section 100, is adapted to display the present state of the portable telephone or the progress situation of a program under the control of the control section 100. An RF (radio frequency) processing section 150 converts an audio signal inputted from a microphone into a digital signal for transmission to a base station through the antenna under the control of the control section 100. In other words, the RF processing section 150 performs the entire processing of the radio signal transmission and reception between the portable telephone and the base station to which the portable telephone belongs. Specifically, the RF processing section 150 converts an input audio signal of a radio frequency band to an intermediate frequency (IF) signal, converts the IF signal to a baseband signal, and then converts the baseband signal to a digital signal. A ring tone generator 160 generates a ring tone through a speaker 190 under the control of the control section 100. An audio processing section 170 modulates audio signals inputted from the microphone 195 for conversion to audio data, and demodulates audio data inputted from the RF processing section 150 and audio data stored in the audio memory 110 to an audio signal to output the demodulated audio signal as voice to the outside through the speaker 190.

The portable telephone 200 used in the present invention generally refers to a portable telephone employing the method of CDMA (Code Division Multiple Access). In the CDMA type telecommunication, the use of a Global Positioning System (GPS) allows for acquisition of time e information from a communication satellite. A base station provides such time information to a telecommunication terminal over a sync channel. At this time, the information transferred through the sync channel carries only one message called a sync channel message. A mobile station is provided with system parameters through this sync channel message. Among these parameters, the most important parameter is the time offset of pilot PN (Pseudo Noise) sequence of a base station associated with a system time and a data transmission speed of a calling channel.

Figure 2A:
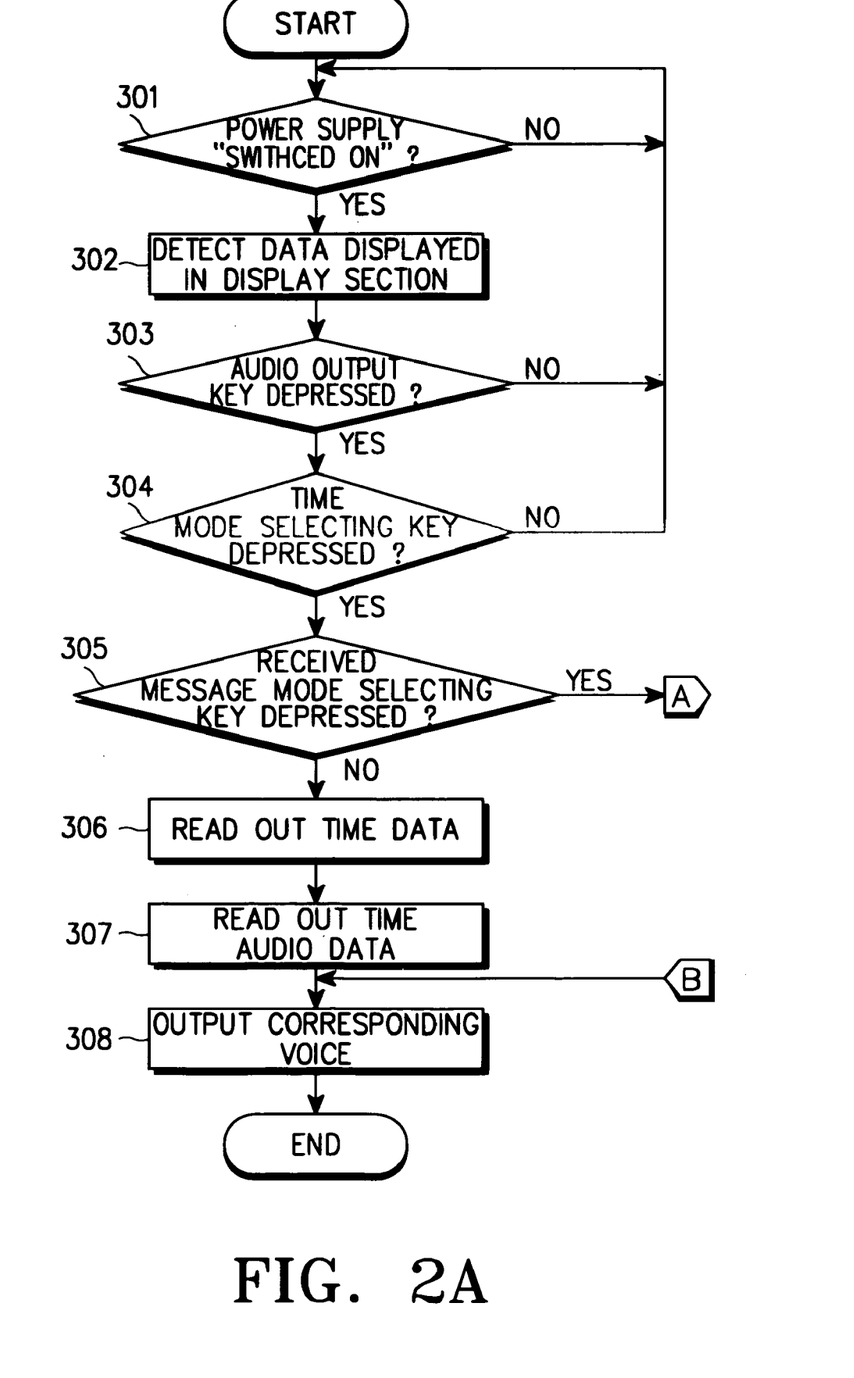
FIGS. 2A and 2B are a control flowchart illustrating the process for outputting, as a voice, data information displayed on a display section of a portable telephone according to a preferred embodiment of the present invention.
Figure 2B:
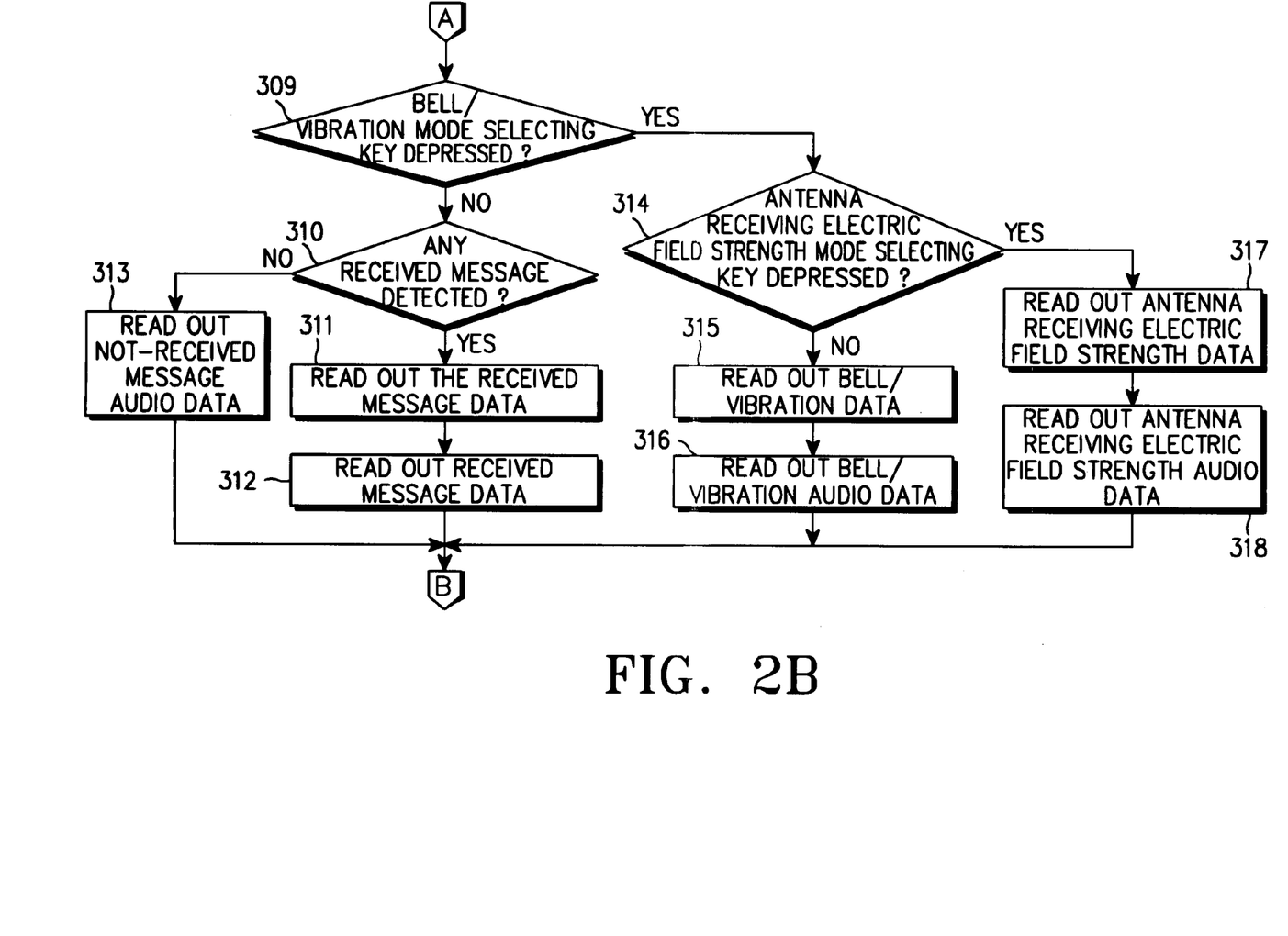

FIGS. 2A and 2B are a control flowchart illustrating the process for outputting, as a voice, data information displayed on a display section of a portable telephone according to a preferred embodiment of the present invention.

Figure 3:
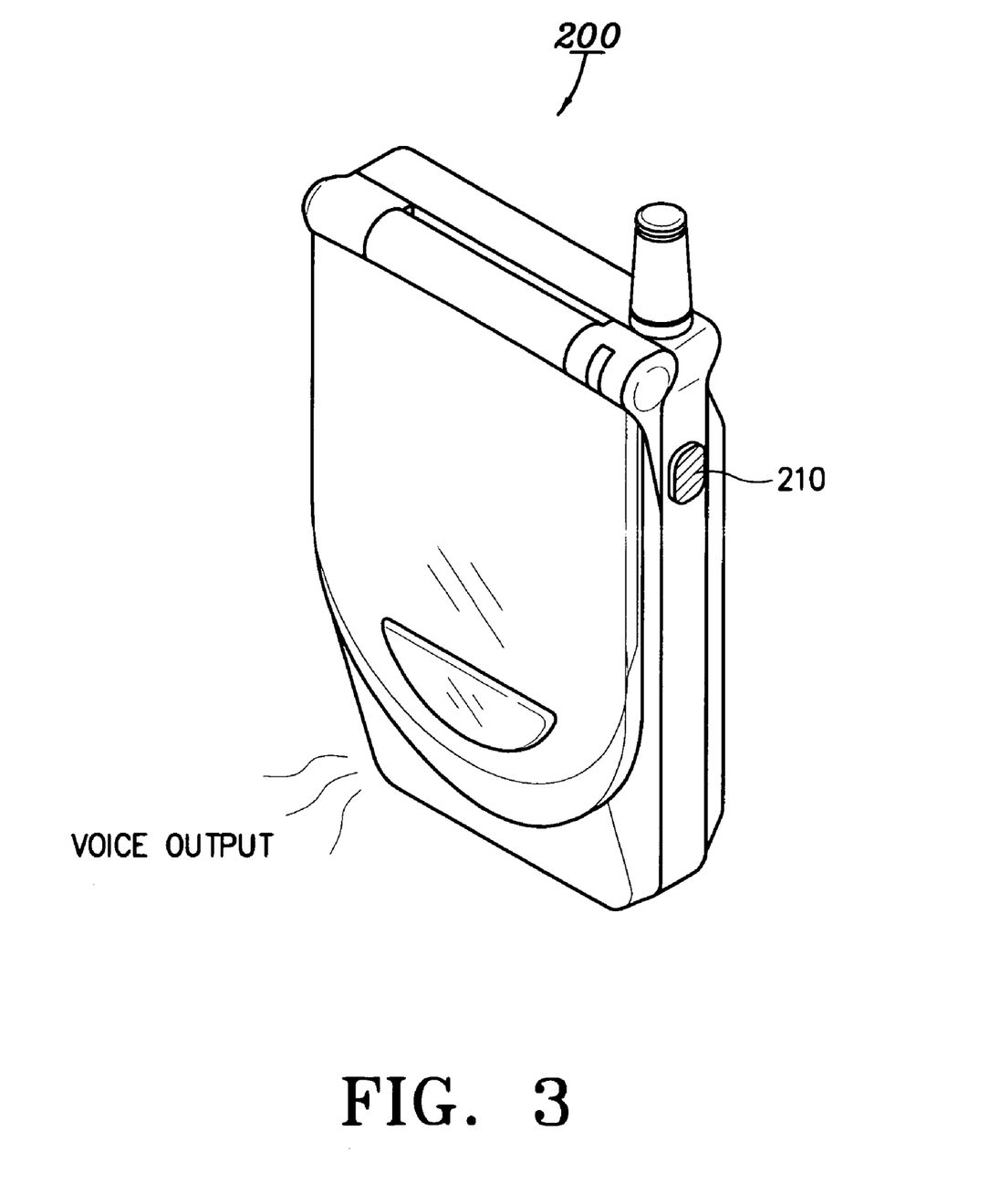
FIG. 3 is a perspective view illustrating a folder type portable telephone including an audio output key installed thereon according to a preferred embodiment of the present invention, in which a folder of the portable telephone is closed.

A preferred embodiment of the present invention will be described in detail hereinafter with reference to FIGS. 1 to 3. The portable telephone may be in an active or a standby state.

First, at step 301, the control section 100 determines whether or not the power supply of the portable telephone 200 is switched on. If it is determined at step 301 that the power supply of the portable telephone 200 is switched on, the program proceeds to step 302 in which the control section 100 detects display data displayed on the display section 140 of the portable telephone 200. At subsequent step 303, the control section 100 determines whether or not an audio output key 210 is depressed through the key input section 130. If it is determined at step 303 that the audio output key 210 is depressed through the key input section 130, the program proceeds to step 304 where the control section 100 determines whether or not a time mode selecting key (not shown) is depressed. At step 304, if it is determined that the time mode selecting key (not shown) is depressed so that the audio output mode is switched into the time mode, the program proceeds to step 305 where the control section 100 determines whether or not a received message mode selecting key is depressed. If at step 304 the time mode selecting key is not depressed, the process returns to step 301. If at step 305 the answer is NO, that is, if it is determined at step 305 that the received message mode selecting key (not shown) is not depressed, the program proceeds to step 306 where the control section 100 reads out time data stored in the memory 120. At this point, the control section 100 detects time data (including date data) received from the base station through the sync channel. The control section 100 calculates the present time according to the time data detected at step 306 by driving the timer 180. At this point, the calculated present time data is updated to be stored in the memory 120 and the control section 100 reads out time and date data stored in the memory 120. Subsequently, the program proceeds to step 307 where the control section 100 reads out an audio data of time stored in the audio memory 110, and a voice message is output at step 308 by speaker 190.

At this time, it should be noted that the time audio data stored in the audio memory 110 can be stored in various manners through a variety of design modifications.

For example, assuming that the time audio data is stored in the audio memory 110 as shown in Table 1, the process for the time audio data to be outputted as a voice through the speaker will be described hereinafter.

TABLE 1

| Address | Number audio data | Unit audio data | Additional audio data |
|---------|-------------------|-----------------|-----------------------|
| 1 | One | a.m. | It (the present time) |
| 2 | Two | p.m. | Is |
| 3 | Three | Past/to | Just |
| 4 | Four | Minute(s) | |
| 5 | Five | Second(s) | |
| 6 | Six | | |
| 7 | Seven | | |
| 8 | Eight | | |
| 9 | Nine | | |
| 10 | Ten | | |

First, it is assumed that it is just five minutes past one a.m. Then, the control section 100 reads out data of "It" stored at address 1 of the additional audio data and data of "is" stored at address 2 of the unit audio data, which are stored in the audio memory 110. Also, the control section 100 reads out data of "just" stored at address 3 of the additional audio data. After that, the control section 100 reads out data of "five" stored at address 5 of the cardinal number audio data, data of "minutes" stored at address 4 of the unit audio data, and data of "past" stored at address 3 of the unit audio data. Lastly, the control section 100 reads out data of "one" stored at address 1 of the cardinal number audio data and data of "a.m." stored at address 1 of the unit audio data, respectively. Then, the control section 100 finally combines these data to synthesize an audio data such as "It is just five minutes past one a.m."

Subsequently, the program proceeds to step 308 where the control section 100 controls the audio processing section 170 to convert the time audio data into an analog data and output the converted audio data through speaker 190. The voice outputted finally according to the process is follows: "It is just five minutes past one a.m."

Meanwhile, if it is determined at step 305 that a received message mode selecting key is depressed while a time mode selecting key is being depressed through the key input section 130, the program proceeds to step 309 in FIG. 2B where the control section 100 determines whether or not a bell/vibration mode selecting key is depressed while the received message mode selecting key is depressed through the key input section 130. If it is determined at step 309 that the bell/vibration mode selecting key is not depressed and, if it is determined that the received message mode selecting key is depressed through the key input section 130 at step 305, the program proceeds to step 310 where the control section 100 determines whether or not there is any received message. If it is determined at step 310 that there is a received message, the program proceeds to step 311 where the control section 100 reads out the received message data stored in the memory 120. Then, at step 312, the control section 100 reads out a received message audio data corresponding to the received message data, which is stored in the audio memory 110. On the other hand, if it is determined at 310 that there is not any received message, the program proceeds to step 313 where the control section 100 reads out a not-received message audio data stored in the audio memory 110.

In the meantime, if it is determined at step 309 that the bell/vibration mode selecting key is depressed through the key input section 130, the program proceeds to step 314 where the control section 100 determines whether or not an antenna receiving electric field strength mode selecting key is depressed while the bell/vibration mode selecting key is depressed through the key input section 130. If it is determined at step 314 that the antenna receiving electric field strength mode selecting key is not depressed so that the audio output mode is not switched into an antenna receiving electric field strength mode (i.e., if it is determined that the bell/vibration mode selecting key is depressed through the key input section 130 at step 309 and the antenna receiving electric field strength mode selecting key is not depressed at step 314), the program proceeds to step 315 where the control section 100 reads out a bell/vibration data stored in the memory 120. Then, at step 316, the control section 100 reads out a bell/vibration audio data corresponding to the bell/vibration data, which is stored in the audio memory 110.

In the meantime, if it is determined at step 314 that the antenna receiving electric field strength mode selecting key is depressed through the key input section 130, the program proceeds to step 317 where the control section 100 reads out a antenna receiving electric field strength data stored in the memory 120. Then, at step 318, the control section 100 reads out an antenna receiving electric field strength audio data corresponding to the antenna receiving electric field strength data, which is stored in the audio memory 110.

The control section 100 controls the program to proceed from the steps 312, 313, 316 and 318 to the step 308 so that the audio processing section 170 converts each of the corresponding audio data into an analog data to output the converted data to the outside through the speaker 190.

Meanwhile, if it is determined at step 303 that the audio output key is not depressed, the program returns to the previous step 301 where the control section 100 performs the series of preceding steps again.

While there has been described what is at present considered to be the preferred embodiment of the present invention, it will be understood by those skilled in the art that various modifications may be made therein without departing from the spirit and scope of the present invention. That is, although the audio output key 210, the time mode selecting key, the received message mode selecting key, the bell/vibration mode selecting key, and the antenna receiving electric field strength mode selecting key have been described therein in such a manner that they are constructed separately in the portable telephone, it should be noted that they may be implemented to one multi-function key including a function of each of the mode selecting keys. For example, in the present invention as a separately mounted audio output key is depressed, and then the time mode selecting key, the received message mode selecting key, the bell/vibration mode selecting key, and the antenna receiving electric field strength mode selecting key are depressed sequentially, a corresponding audio data stored in the audio memory 110 is outputted to the outside. However, the several functional keys set forth may be implemented to one multi-function key. Further, in the present invention, although there has been described a device for and a method of audio outputting data displayed on the display section 140 of the portable telephone 200 in which a corresponding audio data is outputted to the outside as users select any one of the set forth several function keys directly, it should be noted that the present invention may be implemented such that only once key manipulation allows data information displayed on the display section 140 of the portable telephone 200 to be outputted sequentially, as voice, to the outside. That is, as shown in FIG. 3, the present invention may be implemented in such a manner that when users depress the audio output key 210 of the portable telephone 200 only once, the time audio data first is outputted, and then, the received message audio data, the bell/vibration audio data and the antenna receiving electric field strength audio data are outputted in order to the outside so that data information displayed on the display section 140 of the portable telephone 200 can be outputted, as voice, to the outside by a simpler manipulation of the audio output key.

As can be seen from the foregoing, according to a device for and a method of outputting, as a voice, data information displayed on a display section of a portable telephone, data information displayed on the display section of the portable telephone can be outputted, as a voice, to the outside so that it is useful to visually handicapped persons. Further, even in case of using a portable telephone not including a separate display section installed on the exterior thereof, such as folder type portable telephones, users can identify easily, in a voice, data information displayed on the display section of the portable telephone without opening a closed folder in order to see the data information dismayed on the display section.

Therefore, while this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A device for outputting, as a voice, data information displayed on a display section of a portable telephone, comprising:

an audio output key for selecting an audio output mode of the portable telephone;

a memory for storing data displayed on the display section of the portable telephone;

an audio memory for storing audio data corresponding to the audio output mode of the portable telephone;

an audio processing section for modulating an audio signal inputted from a microphone, for converting said audio signal into audio data, for demodulating audio data inputted from an RF processing section and audio data stored in the audio memory to convert into an audio signal, and for outputting said audio signal as a voice; and a control section, when each of a plurality of mode selecting keys is depressed while a predetermined audio output mode is selected by manipulation of the audio output key to control the data read out from the memory and the audio data read out from the audio memory so that the audio data is outputted as a voice through the audio processing section and a speaker.

2. The device according to claim 1 further comprising a time mode selecting key for switching the audio output mode of the portable telephone into a time mode while the audio output mode of the portable telephone is selected in response to depression of the audio output key, wherein a time data displayed on the display section of the portable telephone is read out from the memory and a time audio data corresponding to the time data is read out from the audio memory in response to depression of the time mode selecting key so that the read out-time audio data is outputted as said voice through the audio processing section and then a speaker.

3. The device according to claim 2 further comprising a received message mode selecting key for switching the audio output mode of the portable telephone into a received message mode while the audio output mode is switched into the time mode, wherein a received message data displayed on the display section of the portable telephone is read out from the memory and a received message audio data corresponding to the received message data is read out from the audio memory in response to depression of the received message mode selecting key so that the readout received message audio data is outputted as said voice through the audio processing section and then the speaker.

4. The device according to claim 3 further comprising at least one of a bell and vibration mode selecting key for switching the audio output mode of the portable telephone into at least one of a bell and vibration mode while the audio output mode is switched into the received message mode thereof, wherein at least one of bell and vibration data displayed on the display section of the portable telephone is read out from the memory and at least one of a bell and vibration audio data corresponding to the at least one of the bell and vibration data is read out from the audio memory in response to depression of the at least one of the bell and vibration mode selecting key so that the read out at least one of the bell and vibration audio data is outputted as said voice through the audio processing section and then the speaker.

5. The device according to claim 4 further comprising an antenna receiving electric field strength mode selecting key for switching the audio output mode of the portable telephone into an antenna receiving electric field strength mode while the audio output mode is switched into the at least one of the bell and vibration mode, wherein an antenna receiving electric field strength data displayed on the display section of the portable telephone is read out from the memory and an antenna receiving electric field strength audio data corresponding to the antenna receiving electric field strength data is read out from the audio memory in response to depression of the antenna receiving electric field strength mode selecting key so that the read out-antenna receiving electric field strength audio data is outputted as said voice through the audio processing section and then the speaker.

6. A device for audio outputting display data information displayed on a display section of a portable telephone, comprising:

an audio output key adapted to select an audio output mode of the portable telephone;

a time mode selecting key adapted to switch the audio output mode of the portable telephone into a time mode while the audio output mode of the portable telephone is selected in response to depression of the audio output key;

a received message mode selecting key adapted to switch the audio output mode of the portable telephone into a received message mode while the audio output mode is switched into the time mode;

at least one of a bell and vibration mode selecting key adapted to switch the audio output mode of the portable telephone into at least one of a bell and vibration mode while the audio output mode is switched into the received message mode;

an antenna receiving electric field strength mode selecting key adapted to switch the audio output mode of the portable telephone into an antenna receiving electric field strength mode while the audio output mode is switched into the at least one of the bell and vibration mode;

a memory adapted to store each data displayed on the display section of the portable telephone;

an audio memory adapted to store each audio data corresponding to the audio output mode of the portable telephone;

an audio processing section adapted to modulate an audio signal inputted from a microphone for conversion to an audio data, and demodulate an audio data inputted from an RF processing section and the audio data stored in the audio memory to an audio signal to output the demodulated audio signal as a voice through a speaker; and a control section adapted to read out the data displayed in the display section from the memory and the audio data corresponding to a selected audio output mode from the audio memory, respectively, when each of the mode selecting keys is depressed while a predetermined audio output mode is selected by manipulation of the audio output key to control the data read out from the memory and the audio data read out from the audio memory so that the audio data is outputted as a voice through the audio processing section and a speaker.

7. The device according to claim 6, wherein the audio output key, the time mode selecting key, the received message mode selecting key, the at least one of the bell and vibration mode selecting key, and the antenna receiving electric field strength mode selecting key are constructed as a single multi-function key which includes a function of each of the mode selecting keys.

8. A method of outputting, as a voice, data information displayed on a display section of a portable telephone including an audio output key, comprising the steps of:

detecting data displayed on the display section in response to the selective depression of the audio output key; and reading out audio data corresponding to the detected data from an audio memory and outputting, as a voice, sequential audio data corresponding to the data information displayed on the display section, when each of a plurality of mode selecting keys is depressed while a predetermined audio output mode is selected by manipulation of the audio output key to control the audio data read out from the audio memory so that the audio data is outputted as a voice through an audio processing section and a speaker.

9. A method of outputting, as a voice, data information displayed on a display section of a portable telephone including an audio output key, comprising the steps of:
   detecting data displayed on the display section in a standby state of the portable telephone;
   determining whether or not the audio output key is depressed;
   storing data displayed on the display section in a memory while a corresponding audio output mode is selected in response to depression of the audio output key; and
   reading out the data stored in the memory and an audio data corresponding to the readout data from an audio memory,
   when each of a plurality of mode selecting keys is depressed while a predetermined audio output mode is selected by manipulation of the audio output key to control the data read out from the memory and the audio data read out from the audio memory so that the audio data is outputted as a voice through an audio processing section and a speaker.

10. A method of outputting, as a voice, data information displayed on a display section of a portable telephone including an audio output key, a time mode selecting key, a received message mode selecting key, at least one of a bell and vibration mode selecting key, and an antenna receiving electric field strength mode selecting key comprising the steps of:
    selecting an audio output mode of the portable telephone;
    switching the audio output mode of the portable telephone into a time mode in response to depression of the time mode selecting key while the audio output mode of the portable telephone is selected in response to depression of the audio output key;
    switching the audio output mode of the portable telephone into a received message mode in response to depression of the received message mode selecting key while the audio output mode is switched into the time mode;
    switching the audio output mode of the portable telephone into at least one of a bell and vibration mode in response to depression of the at least one of the bell and vibration mode selecting key while the audio output mode is switched into the received message mode;
    switching the audio output mode of the portable telephone into an antenna receiving electric field strength mode in response to depression of the antenna receiving electric field strength mode selecting key while the audio output mode is switched into the at least one of the bell and vibration mode;
    storing each data displayed on the display section of the portable telephone in a memory;
    storing each audio data corresponding to the audio output mode of the portable telephone in an audio memory;
    modulating an audio signal inputted from a microphone for conversion to an audio data, and demodulating an audio data inputted from an RF processing section and the audio data stored in the audio memory to an audio signal through an audio processing section to output the demodulated audio signal as voice through a speaker; and
    reading out the data displayed in the display section from the memory and the audio data corresponding to a selected audio output mode from the audio memory, respectively, when each of the mode selecting keys is depressed while a predetermined audio output mode is selected by manipulation of the audio output key to control the data read out from the memory and the audio data read out from the audio memory so that the audio data is outputted as a voice through the audio processing section and the speaker.

* * * * *